US012745720B2

(12) United States Patent
Acuff, IV

(10) Patent No.: US 12,745,720 B2
(45) Date of Patent: Sep. 29, 2026

(54) ADJUSTABLE TREE JACK

(71) Applicant: Lindsay Sims Acuff, IV, Atlanta, GA (US)

(72) Inventor: Lindsay Sims Acuff, IV, Atlanta, GA (US)

(73) Assignee: TREE TECH TOOLS INC., Villa Rica, GA (US)

( * ) Notice: Subject to any disclaimer, the term of this patent is extended or adjusted under 35 U.S.C. 154(b) by 0 days.

(21) Appl. No.: 19/348,001

(22) Filed: Oct. 2, 2025

(65) Prior Publication Data

US 2026/0114390 A1 Apr. 30, 2026

Related U.S. Application Data

(60) Provisional application No. 63/712,051, filed on Oct. 25, 2024.

(51) Int. Cl.
*A01G 23/099* (2006.01)
*B66F 11/00* (2006.01)

(52) U.S. Cl.
CPC ............ *A01G 23/099* (2013.01); *B66F 11/00* (2013.01)

(58) Field of Classification Search
CPC ...... A01G 23/099; A01G 23/003; B66F 11/00
See application file for complete search history.

(56) References Cited

U.S. PATENT DOCUMENTS 6,604,562 B1 * 8/2003 Smith .................. A01G 23/091 144/34.1
2021/0246007 A1 * 8/2021 Cavazos .............. A01G 23/003
2025/0052087 A1 * 2/2025 Moore .................... E04F 10/04

* cited by examiner

*Primary Examiner* — Seahee Hong
(74) *Attorney, Agent, or Firm* — MEHRMAN LAW OFFICE; Michael Mehrman

(57) ABSTRACT

An adjustable tree jack configured for assembly and disassembly into smaller, hand-carried sub-assemblies for field portability including an adjustable jack stand compatible with a variety of jack mechanisms, and a selected jack mechanism. A representative jack stand includes a base, a lower frame removably connectible to the base, and a telescoping riser removably receivable by a riser receiver of the lower frame. The lower frame defines a slot and the telescoping riser includes a lifting rod removably receivable within the slot. The jack mechanism is removably capturable between a support bracket and the lifting rod for lifting and lowering the telescoping riser under load allowing the telescoping riser to be lifted under load causing lifting displacement of the telescoping riser with respect to the lower frame with the lifting rod traveling within the slot.

14 Claims, 7 Drawing Sheets

ADJUSTABLE TREE JACK

REFERENCE TO RELATED APPLICATIONS

This application claims priority to U.S. Provisional Pat. App. Ser. No. 63/712,051 filed Oct. 25, 2024, which is incorporated by reference.

TECHNICAL FIELD

This invention relates to lifting devices and, more particularly, to a heavy-duty adjustable tree jack for lifting and supporting fallen tree trunks when removing them from structures.

BACKGROUND OF THE INVENTION

The present invention relates to arborist tools, specifically addressing the need for a heavy-duty tree jack capable of safely lifting large, fallen trees from structures. Unlike prior light-duty tree jacks designed for limited lifting purposes, a need exists for a heavy-duty tree jack built to handle significant loads of five tons or more. Trees fallen on structures in storms often present unique hazards due to the tension between the portion of the tree on the ground and the part resting on the structure. Without proper support, releasing this tension can release the tree to fall further resulting in severe property damage, personal injury, or catastrophic failure of jacks or cranes used in the process.

Existing tree jacks lack the strength, stroke length and support frame to lift large tree trunks effectively, often leading to unsafe working conditions. There is a need for a heavy-duty tree jack providing the desired combination of strength, size and portability specifically designed to lift and support tree trunks fallen on structures safely.

SUMMARY OF THE INVENTION

The invention may be embodied as an adjustable tree jack for assembly and disassembly into smaller, hand-carried sub-assemblies for field portability. The adjustable tree jack generally includes an adjustable jack stand compatible with a variety of jack mechanisms, and a selected jack mechanism. Adjustable jack stands may be provided with different selected jack mechanisms, or separately without a particular jack mechanism, to meet the needs of different users. In general, the disclosed adjustable jack stand is compatible with a variety of commercially available hand-crank and hydraulic jack mechanisms in the 5 ton to 20 ton range.

The adjustable jack stand includes several sub-assemblies that can be easily disassembled and carried by hand on a job site from a service truck to the location of a particular fallen tree to be lifted, assembled at the location of the particular tree, and then disassembled again for carrying back to the truck or other location after the tree has been removed. In a representative embodiment, these sub-assemblies include a base, a lower frame removably connectible to the base, and a telescoping riser removably receivable by a riser receiver of the lower frame. The lower frame defines a slot and the telescoping riser includes a lifting rod removably receivable within the slot. The jack mechanism is removably captured between a support bracket and the lifting rod for lifting and lowering the telescoping riser under load allowing the telescoping riser to be lifted under load causing lifting displacement of the telescoping riser with respect to the lower frame with the lifting rod traveling within the slot. For example, the jack mechanism may be captured between a support bracket on the lower frame, where the support bracket or the bottom portion of the lower frame is pivotally connected to the base. The jack mechanism may lift the telescoping riser, with the telescoping riser extended within a range of selected states of extension of the telescoping riser.

Additional optional features include a tree brace for interfacing with a fallen tree trunk lifted by the telescoping riser. The lower frame may include a pair of adjustable leg brackets that removably receive a pair of telescoping legs that attach to respective leg brackets at selectable pivotal positions. A pair of feet may be pivotally and removably attached to respective telescoping legs. The lower base may include a support bracket for removably receiving the jack mechanism. The support bracket forms a fulcrum allowing the lower frame to tilt with respect to the base while supporting the jack mechanism. This facilitates the user maneuvering the jack stand into the desired lifting position and angle for a tree trunk leaning on a structure before cranking the jack mechanism to lift the trunk off the structure.

It will be understood that specific embodiments may include a variety of features in different combinations, as desired by different users. The specific techniques and structures for implementing particular embodiments of the invention and accomplishing the associated advantages will become apparent from the following detailed description of the embodiments and the appended drawings and claims.

DETAILED DESCRIPTION OF ILLUSTRATIVE EMBODIMENTS

Figure 1A:
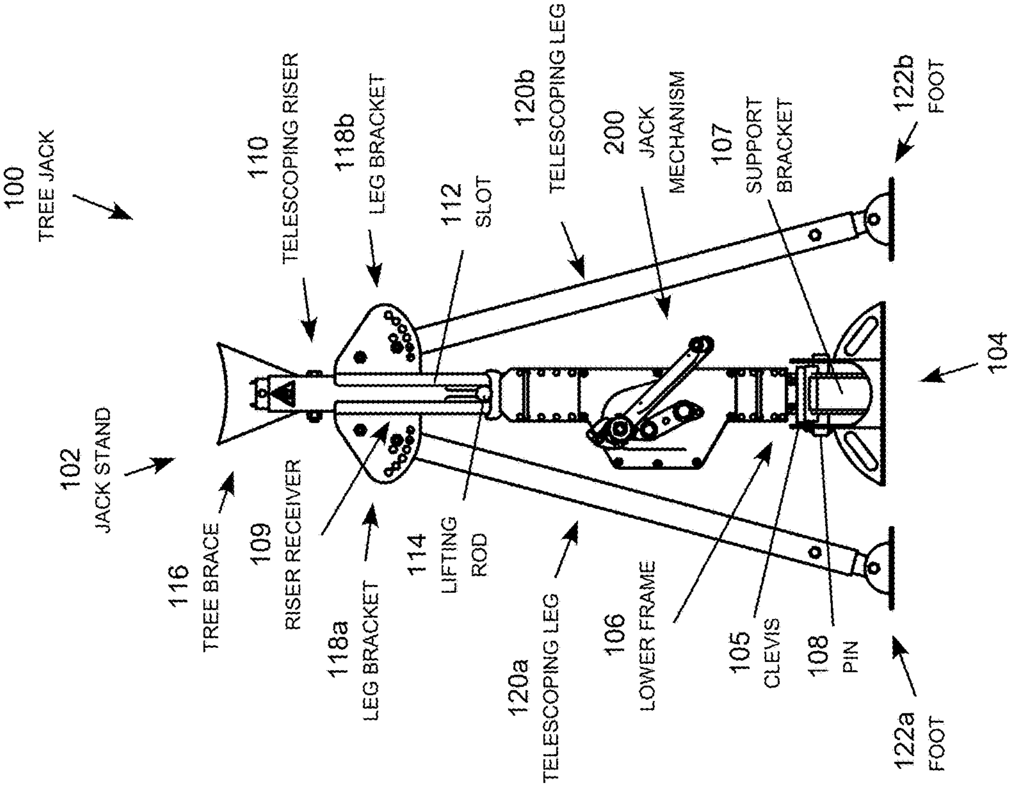
FIGS. 1A and 1B are front views of an adjustable tree jack before and after the jack mechanism expands the height of a jack stand.

The invention may be embodied as an adjustable tree jack or a jack stand for the adjustable tree jack. The adjustable tree jack includes a jack stand and a jack mechanism. As the jack stand is generally compatible with a variety of jack mechanisms, the jack stand may be provided with or without a particular jack mechanism. In general, commercially available hand crank and hydraulic jack mechanisms in the 5 ton to 20 ton capacity range are compatible with the jack stand, which is designed for assembly and disassembly into smaller, hand-carried sub-assemblies for field portability. A representative jack stand includes a base, a lower frame removably connectible to the base, and a telescoping riser removably receivable by a riser receiver of the lower frame. The lower frame defines a slot and the telescoping riser includes a lifting rod removably receivable within the slot. The jack mechanism is removably capturable between a support bracket and the lifting rod for lifting and lowering the telescoping riser under load allowing the telescoping riser to be lifted under load causing lifting displacement of the telescoping riser with respect to the lower frame with the lifting rod traveling within the slot. For example, the jack mechanism may be captured between a support bracket on the lower frame and the lifting rod. The support bracket or a bottom portion of the lower frame may be pivotally connected to the base. The jack mechanism may lift the telescoping riser, with the telescoping riser extended within a range of selected states of extension of the telescoping riser.

Additional optional features include a tree brace for interfacing with a fallen tree trunk lifted by the telescoping riser. The lower frame may include a pair of adjustable leg brackets that removably receive a pair of telescoping legs that attach to respective leg brackets at selectable pivotal positions. A pair of feet may be pivotally, which may also be removable, attached to respective telescoping legs. The lower frame may include a support bracket for removably receiving the jack mechanism. The support frame or a bottom portion of the lower frame may be pivotally attached to a clevis of the base by a pin. The support bracket forms a fulcrum allowing the lower frame to tilt with respect to the base while supporting the jack mechanism. This facilitates the user maneuvering the jack stand into the desired lifting position and angle for a tree trunk leaning on a structure before cranking the jack to lift the trunk off the structure.

Representative adjustable tree jacks capable of lifting five tons or more may be constructed from high-strength steel, aluminum, titanium, graphene, polycarbonate, fiberglass, or other suitable materials and composites. The adjustable tree jack fills a critical gap between light-duty jacks unsuitable for handling large tree trunks and the need for arborists to have a reliable, portable tool capable of managing extreme loads.

A manual hand crank or hydraulic jack mechanism supported by the jack stand provides significant lifting force for large, fallen trees. Despite its heavy-duty design, the adjustable tree jack remains portable. It can be disassembled into smaller components for easy transportation to remote or difficult-to-access areas. These components can be hand-carried and reassembled on-site within a few minutes, ensuring the device can be deployed quickly in emergency situations without sacrificing strength. A stable footing system is adaptable to uneven terrain for enhanced safety and stability during use.

The adjustable tree jack features a heavy-duty telescoping jack stand built from suitable high-strength materials, designed to handle a minimum load of five tons. The jack stand can be adjusted to different heights and widths to accommodate various tree sizes and scenarios. A telescoping riser allows the tree brace to be lifted into position and locked in place adjacent to the tree trunk before the jack mechanism is utilized to lift the telescoping riser further under load. The jack mechanism thus causes lifting displacement of the telescoping riser in a selected state of telescoping extension. This makes it suitable for reaching and then lifting large sections of fallen trees, ensuring that even the most substantial trunks can be safely elevated. The jack stand is engineered for heavy-duty performance, offering durability in demanding field conditions while maintaining the necessary portability.

Stability is a key safety feature of the adjustable tree jack. It is equipped with telescoping legs providing an adjustable width base and pivoting feet, allowing it to maintain firm positioning on uneven terrain. The pivoting footing system can be adapted to various ground conditions, ensuring that the adjustable tree jack remains stable even under extreme loads.

Despite its heavy-duty design, the adjustable tree jack is engineered for portability. The device breaks down into smaller, manageable components that can be easily hand-carried into the field. The reassembly process is simple, requiring only a few minutes to set up. This combination of strength and portability makes the adjustable tree jack the ideal tool for arborists working in residential environments where heavy equipment access is limited.

The adjustable tree jack is versatile and can be used in various arborist operations, such as tree removal, forest management, and emergency response after storm damage. Its ability to handle large loads makes it a valuable tool for safely managing the removal of large trees from residential, commercial, and public structures.

The adjustable jack is a heavy-duty, high-capacity lifting device, constructed from durable steel or aluminum, capable of lifting five tons or more. It is designed for arborists who need to safely and efficiently remove large trees that have fallen onto structures. The adjustable tree jack features a telescoping jack stand, a powerful manual or hydraulic jack mechanism, and a stable base, providing unparalleled control and support during the lifting process.

The adjustable tree jack is compatible with a wide variety of commercially available manual or hydraulic jack mechanism, which provide flexibility in the selection of the jack mechanism for different users. The powerful jack mechanism allows the user to exert precise control over the lifting of large tree sections, ensuring the controlled release of tension. This feature makes the adjustable tree jack ideal for situations where sudden shifts could cause structural damage or injury.

In general, commercially available jack mechanisms compatible with the adjustable jack include robust safety features to protect against accidental collapse. The jack mechanism typically includes an integrated locking mechanisms to ensure stability during lifting operations. Additionally, compatible jack mechanisms are typically equipped with a controlled release system, allowing the arborist to lower the tree safely and slowly when required. Compatible jack mechanisms are also typically equipped a safety lock mechanism to prevent unintended collapse during operation and a controlled release feature that allows for the safe and gradual lowering of lifted tree sections. The telescoping jack stand is designed for disassembly into smaller, hand-carried sub-assemblies for field portability through a quick reassembly feature, such as pin, bolts or universal quick-release fasteners that allow the jack stand to be easily disassembles or reassembled on the site of the fallen tree within a few minutes.

Figure 1B:
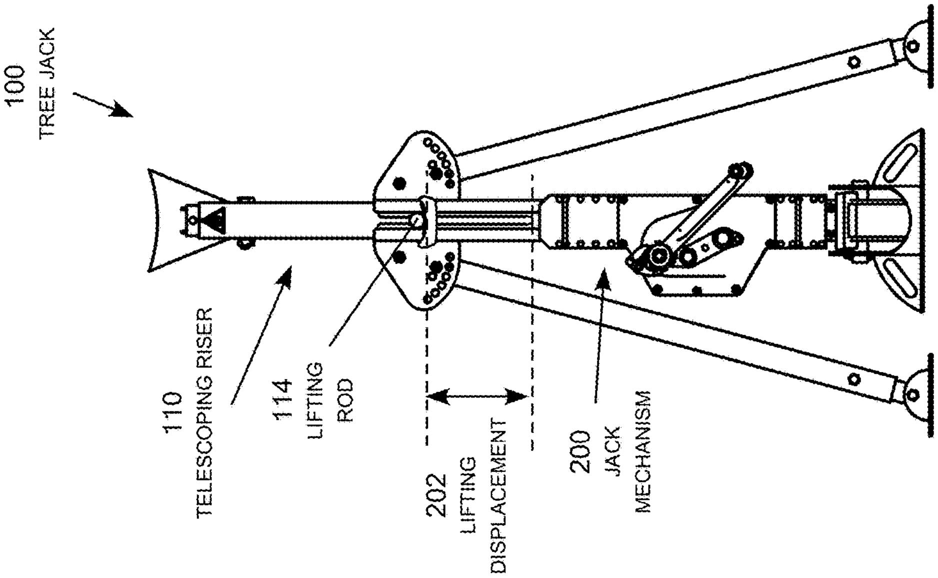
Figure 2A:
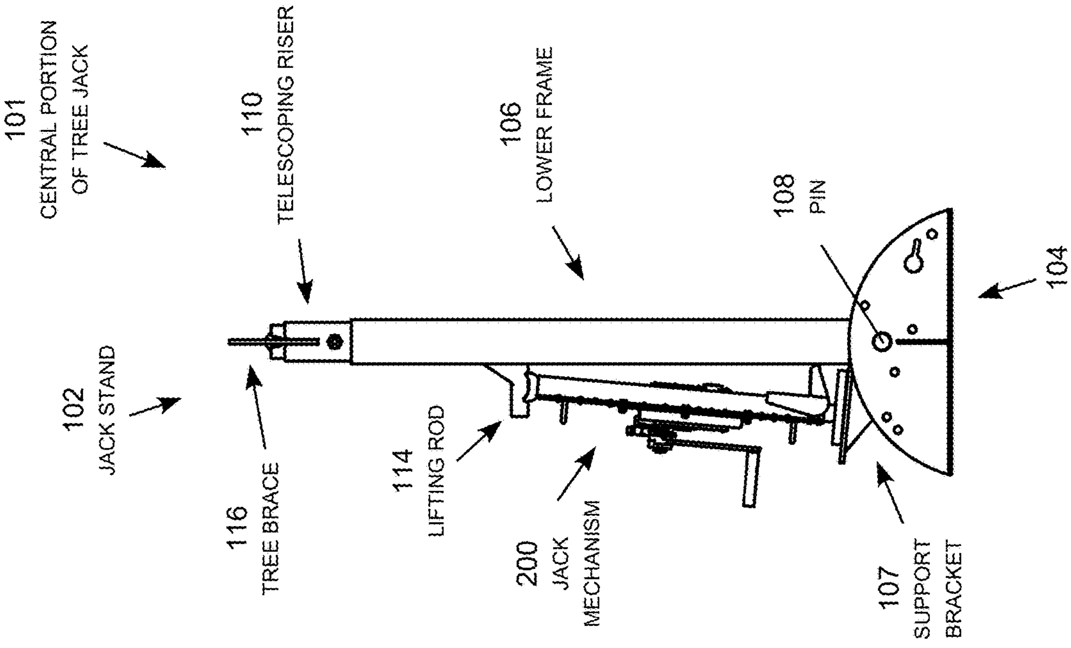
FIGS. 2A and 2B are side views of the adjustable tree jack before and after the jack mechanism expands the height of a jack stand.
Figure 2B:
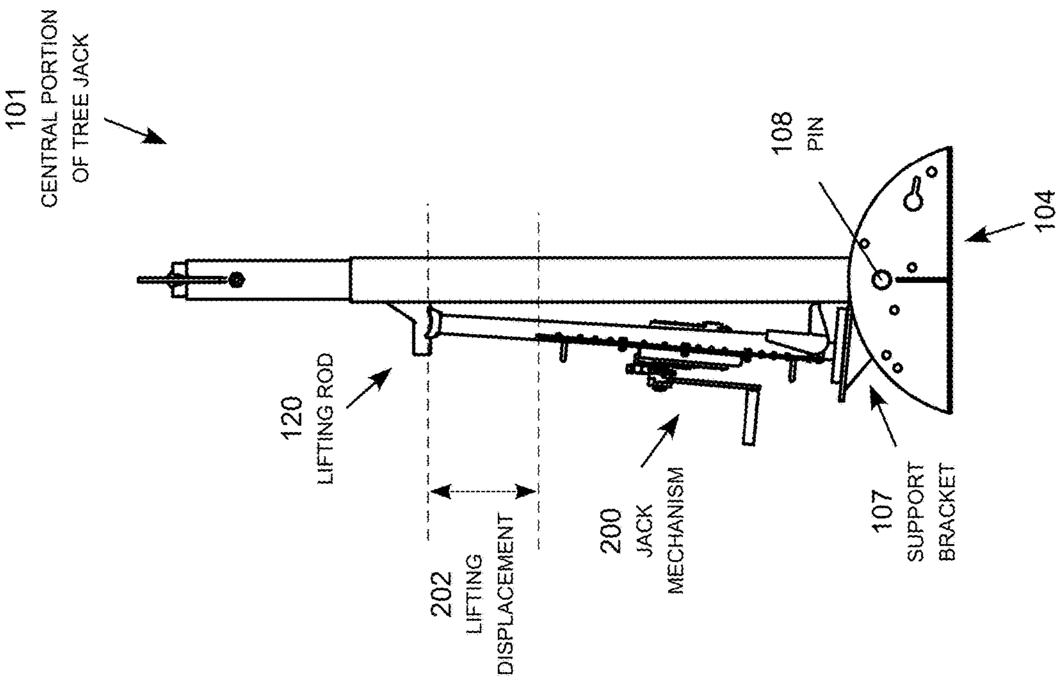
Figures 3A, 3B, 3C:
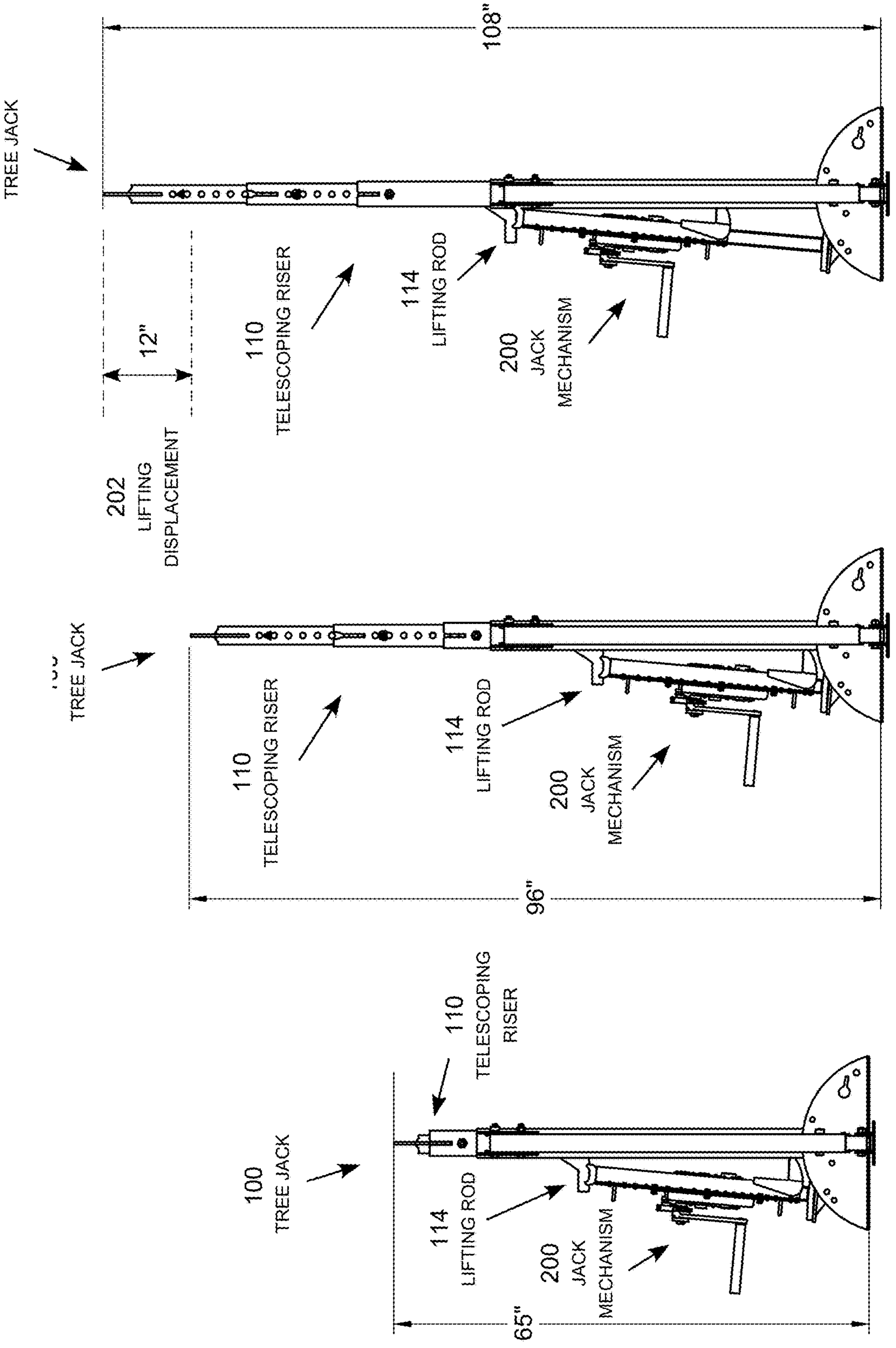
FIGS. 3A-3C are side views illustrating a representative adjustable tree jack illustrating a lifting displacement with position with example dimensions shown for a representative embodiment.

Referring now to the figures, FIGS. 1A and 1B are front views and FIGS. 2A and 2B are side views of an adjustable tree jack 100 before and after using a jack mechanism 200 to expand the height of the jack stand 102 supporting the jack mechanism. FIGS. 2A and 2B omit the telescoping legs 120*a*, 120*b* and feet 122*a*, 122*b* shown in FIGS. 1A, 1B to avoid cluttering the figures. FIGS. 3A-3C are side views illustrating the representative adjustable tree jack 100 illustrating its lifting displacement 202 with typical dimensions shown. These figures show the assembled tree jack 100, while FIGS. 4-8 show various partially disassembled views and parts.

In this example, the jack stand 102 includes base 104 that includes a clevis 105 for removably attaching the lower frame 106 to the base. The bottom portion of the lower frame 106 includes a support bracket 107 for supporting the jack mechanism 200. A removable pin 108 pivotally attaches the lower portion of the lower frame 106 to the clevis 105 allowing the lower frame 106 and support bracket 107 to pivot with respect to the base 104. Alternatively, the support bracket 107 attached to the lower frame 106 may be pivotally attached to the clevis 105. This is an important stability feature allowing the jack mechanism 200 to tilt with the lower frame 106 to obtain a desired angle for lifting the heavy tree trunk, while the base 104 remains at a desired angle with respect to the ground. Stakes, anchor screws, guy wires or other stabilizers may be used to provide additional connection and stability between the base 104 and the ground when lifting on a slope or unstable ground.

The upper end of the lower frame 106 includes an open-channel riser receiver 109 that removably receives a telescoping receiver 110. The upper portion of the riser receiver 109 defines an upright slot 112 that receives a lifting rod 114 midway along the telescoping receiver. The telescoping receiver 110 is shown in retracted position in FIGS. 1A-1B, 2B-2B and 3A, and in an extended position in FIGS. 3B-3C. A tree brace 116 for interfacing with the tree trunk to be lifted is positioned on the top end of the telescoping riser 110. The tree brace 116 may be beveled to dig into the tree trunk under load for a stable connecting when lifting the heavy trunk.

The lower frame 106 also includes leg brackets 118*a*, 118*b* for removably attaching the top ends of telescoping legs 120*a*, 120*b* to respective leg brackets. The leg brackets 118*a*, 118*b* include a number of holes for attaching the telescoping legs at selected angles with respect to the lower frame 106. The bottom ends of the telescoping legs 120*a*, 120*b* are pivotally attaches to feet 122*a*, 122*b*, which may also be removable. Stakes, anchor screws, guy wires or other stabilizers may be used to provide additional connection and stability between the feet 122*a*, 122*b* and the ground when lifting on a slope or unstable ground.

FIGS. 3A-3C are side views illustrating the representative adjustable tree jack 100 illustrating its lifting displacement 202 with typical dimensions shown. FIG. 3A shows the adjustable tree jack 100 with the telescoping riser 110 in its fully retracted position and the lifting rod 114 in its lower position. This is the typical configuration after assembly before adjusting the jack into its lifting configuration for the particular job. FIG. 3B shows the adjustable tree jack 100 with the telescoping riser 110 in its fully extended position and the lifting rod 114 in its lower position. This configuration the maximum extension before lifting with the jack mechanism 200. The user can extend the telescoping riser 110 to any selectable state of telescoping extension between FIGS. 3A and 3B to achieve the lifting configuration most suitable for the particular job.

FIG. 3C shows the adjustable tree jack 100 with the telescoping riser 110 in its fully extended position and the jack mechanism 200 at tis upper position illustrating the maximum lifting displacement 202 under load. Of course, the maximum lifting displacement 202 may be imparted to lift the tree trunk at any selectable state of telescoping extension between FIGS. 3A and 3B to achieve the lifting displacement for the particular job. The jack mechanism 200 thus causes lifting displacement 202 of the telescoping riser in an of a variety of selected states of extension of the telescoping riser. This makes the adjustable tree jack 100 suitable for reaching and then lifting large sections of fallen trees, ensuring that even the most substantial trunks can be safely elevated.

FIGS. 3A-3C are shown substantially to scale with example dimensions shown for a representative embodiment. FIG. 3A shows a tree jack height of 68 inches (173 cm) with the telescoping riser 110 in its fully retracted position and the lifting rod 114 in its lower position. FIG. 3B shows a tree jack height of the 96 inches (244 cm) with the telescoping riser 110 in its fully extended position and the lifting rod 114 in its lower position. FIG. 3C shows a tree jack height of 108 inches (274 cm) with the telescoping riser 110 in its fully extended position and the lifting rod 114 in its upper position.

Figure 4:
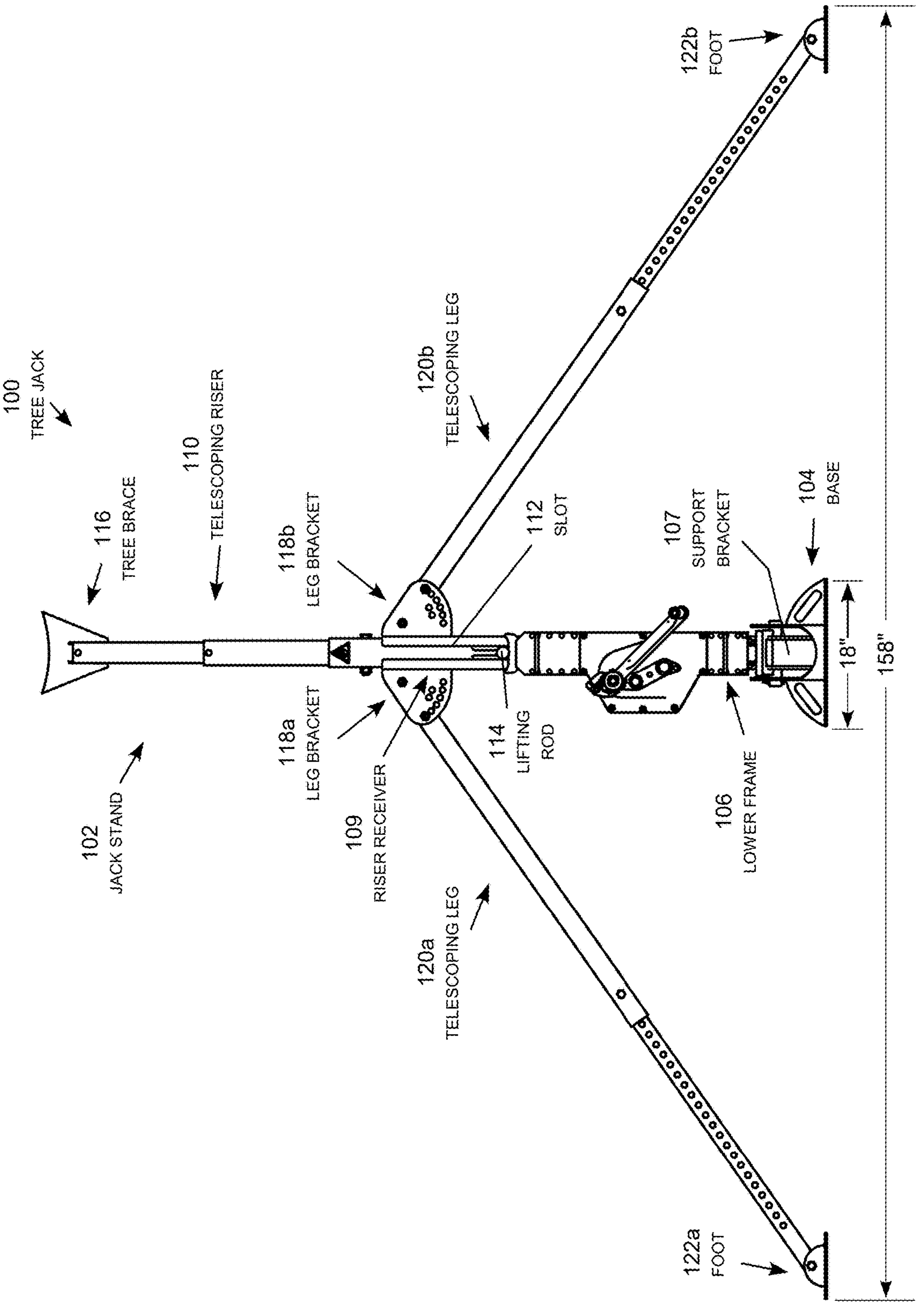
FIG. 4 is a front view of the adjustable tree jack in an extended position with example dimensions shown for a representative embodiment.

FIG. 4 is a front view of the adjustable tree jack 100 at its full height and full width example dimensions shown for a representative embodiment. In this example, the maximum width with the telescoping legs fully extended is 158 inches (401 cm).

Figure 5:
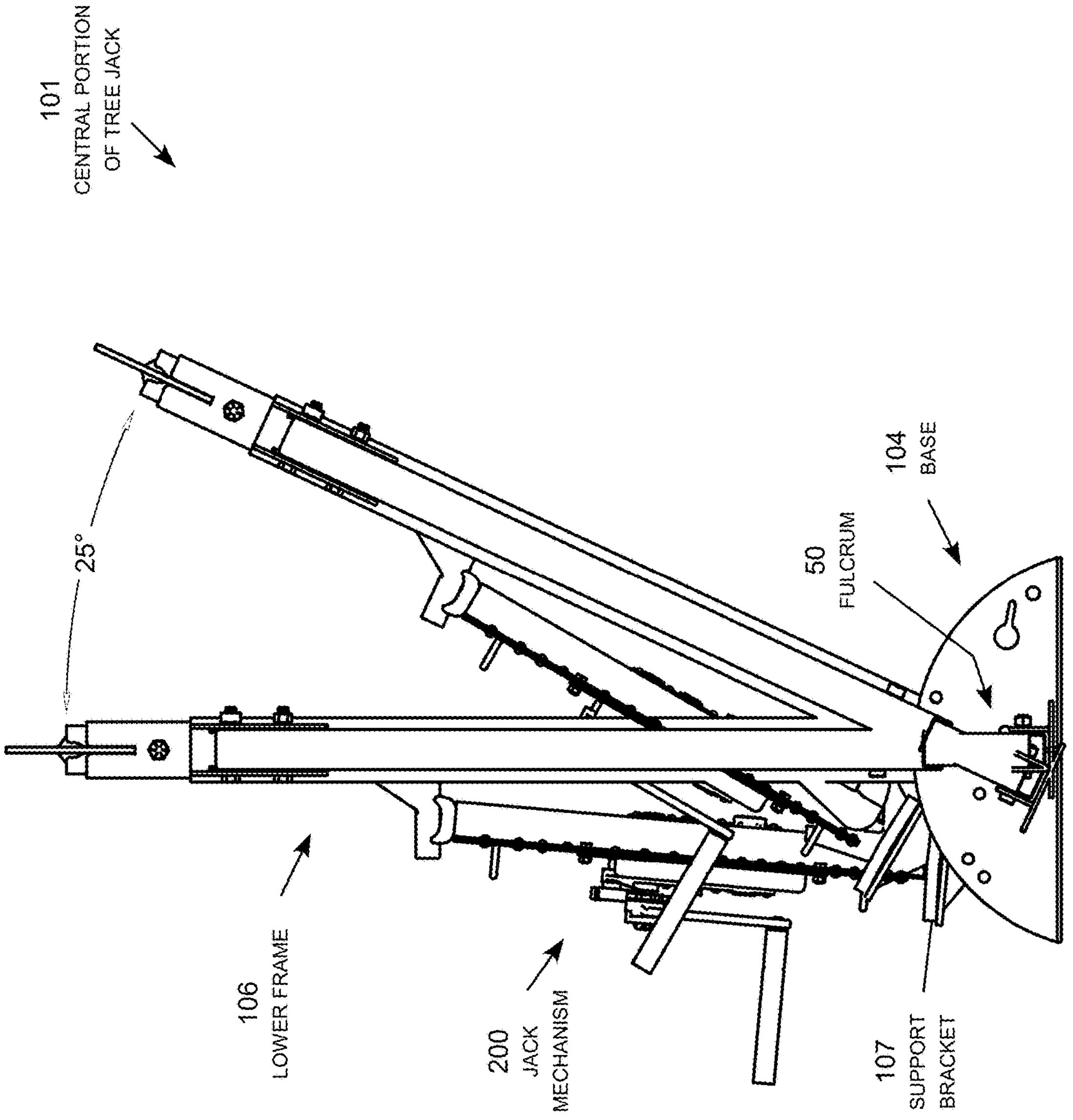
FIG. 5 is a side view of central portion of the adjustable tree jack illustrating pivotal movement of the lower frame with respect to a base of the adjustable tree jack.

FIG. 5 is a side view of central portion 101 of the adjustable tree jack 100 illustrating pivotal movement of the lower frame 106 with respect to a base 104. In this example, the bottom portion of the lower base 106 is shown to illustrate the fulcrum 50 formed by the bottom portion of the lower frame 106 as it tilts between vertical and 25° from vertical. Alternatively, the support bracket 107 attached to the lower frame 106 may be pivotally attached to the clevis 105 to achieve an equivalent pivoting function.

Figure 6:
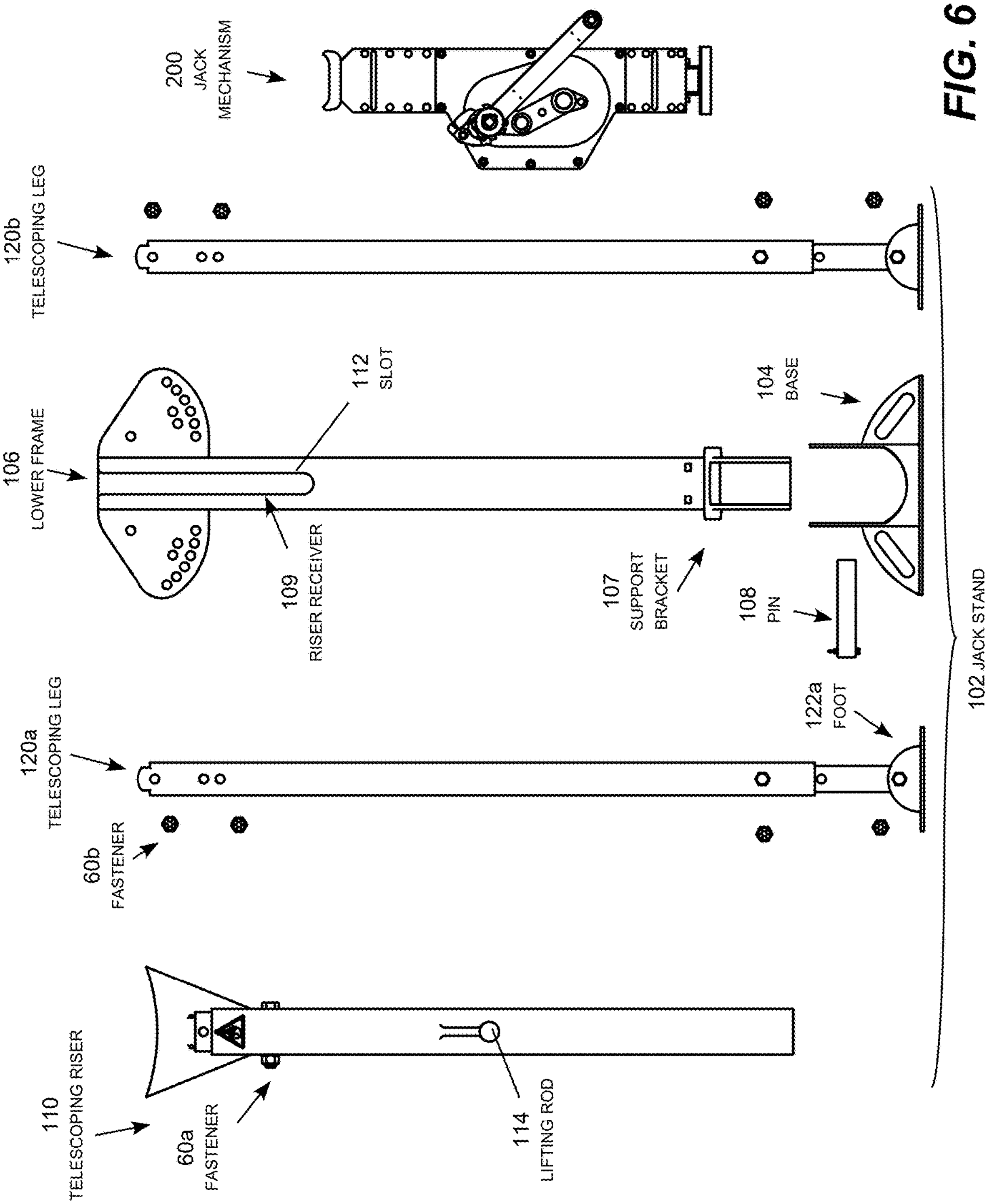
FIG. 6 is a front view of partially disassembled sub-assemblies of the adjustable tree jack.

FIG. 6 is a front view of partially disassembled sub-assemblies of the adjustable tree jack 100 suitable for carrying by hand on a job site. The sub-assemblies are assembled with fasteners represented by the enumerated fasteners 60*a*, 60*b*. The partially disassembled sub-assemblies of the jack stand 102 include the telescoping riser 110, the telescoping legs 120*a*-120*b*, the base 104, and the lower frame 106. The jack mechanism 200 is also removable and carried separately.

Figure 7:
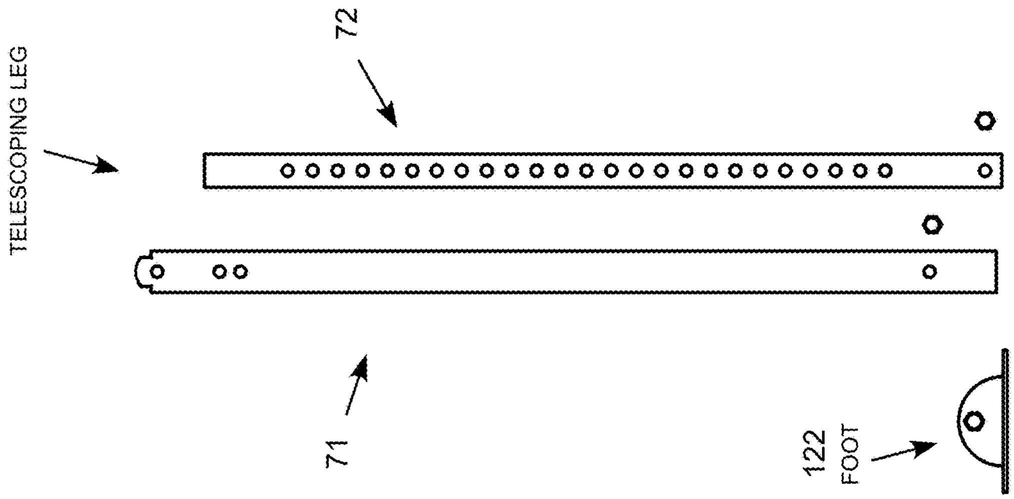
FIG. 7 is a front view of further disassembled components the telescoping leg of the adjustable tree jack.

FIG. 7 is a front view of further disassembled components the telescoping leg of the adjustable tree jack 100. More specifically, FIG. 7 shows the further disassembly of a representative telescoping leg 120 into an outer leg channel 71, an inner leg channel 72, and a foot 122.

Figure 8:
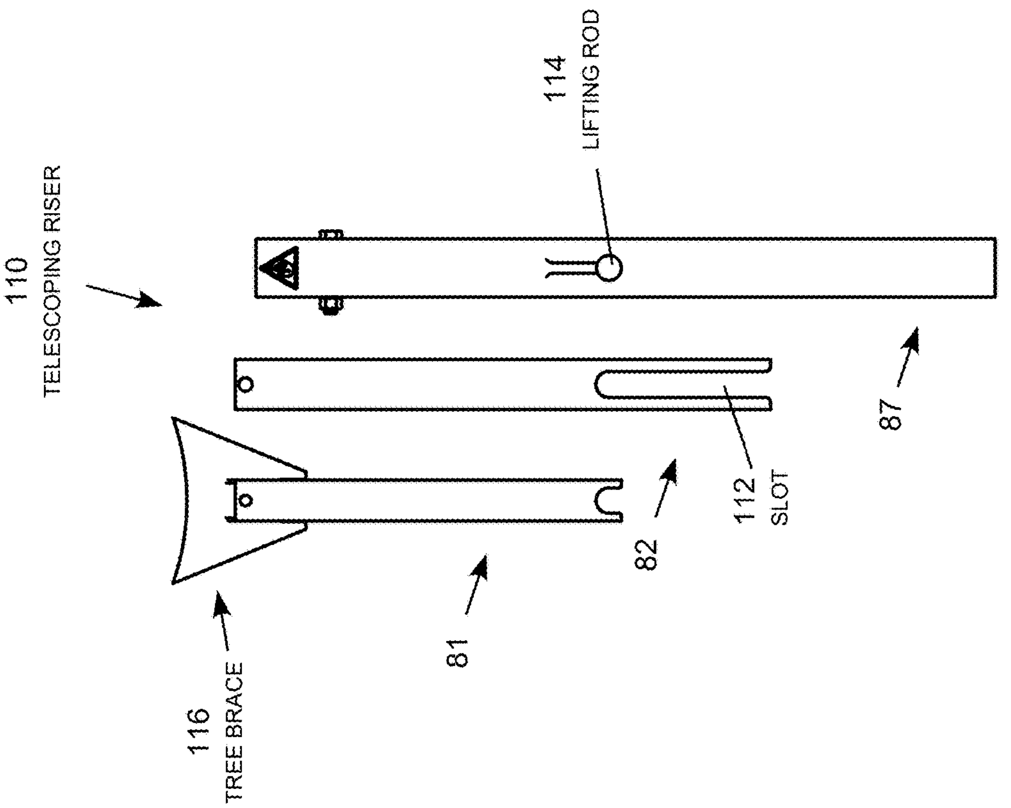
FIG. 8 is a front view of additional further disassembled components of a telescoping riser of the adjustable tree jack.

FIG. 8 is a front view of additional further disassembled components of a telescoping riser of the adjustable tree jack. More specifically, FIG. 8 shows the further disassembly of a representative telescoping riser 110 into an inner riser channel 81 carrying the tree brace 116, an central riser channel 82 defining the slot 112, and inner riser channel 87 carrying the lifting rod 114.

It will therefore be appreciated that the adjustable tree jack can be easily assembled and dissembled with fasteners, such as pins, bolts, universal quick-release connectors, or other suitable fasteners. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations. It will therefore be appreciated that present invention provides significant improvements. The foregoing relates only to the exemplary embodiments of the present invention, and that numerous changes may be made therein without departing from the spirit and scope of the invention as defined by the following claims.

It should be understood that the foregoing relates only to the exemplary embodiments of the present invention, and that numerous changes may be made therein without departing from the spirit and scope of the invention as defined by the following claims.

The invention claimed is:

1. An adjustable tree jack for assembly and disassembly into smaller, hand-carried sub-assemblies for field portability, comprising:

a jack stand comprising a base, a lower frame removably connectible to the base, and a telescoping riser removably receivable by a riser receiver of the lower frame, the lower frame comprising a pair of adjustable leg brackets, defining a slot and wherein the telescoping riser comprising a lifting rod removably receivable within the slot;

a jack mechanism removably capturable between a support bracket and the lifting rod for lifting and lowering the telescoping riser under load;

a pair of telescoping legs, each telescoping leg configured for removable attachment to its respective adjustable leg brackets at a plurality of selectable pivotal positions for adjustable width support of the lower frame;

wherein lifting the telescoping riser under load causes lifting displacement of the telescoping riser with respect to the lower frame, the adjustable leg brackets, and the telescoping legs with the lifting rod traveling within the slot.

2. The adjustable tree jack of claim 1, wherein the jack mechanism is configured for causing lifting displacement of the telescoping riser in a selected state of telescoping extension.

3. The adjustable tree jack of claim 1, wherein the telescoping riser further comprising a tree brace for interfacing with a fallen tree trunk lifted by the telescoping riser.

4. The adjustable tree jack of claim 1, further comprising a pair of feet, wherein each foot is configured for removable attachment to a respective telescoping leg.

5. The adjustable tree jack of claim 4, wherein each foot is configured for pivotal attachment to its respective telescoping leg.

6. The adjustable tree jack of claim 1, wherein the jack mechanism is positioned between the support bracket on the lower frame pivotally connected to the base and the lifting rod for adjustable tilt of the lower frame with respect to the base.

7. The adjustable tree jack of claim 6, wherein the support bracket or a bottom portion of the lower frame is configured for pivotal attachment to the base for adjustable tilt of the lower frame with respect to the base.

8. A jack stand for an adjustable tree jack for assembly and disassembly into smaller, hand-carried sub-assemblies for field portability, comprising:

a base;

a lower frame removably connectible to the base comprising a pair of adjustable leg brackets and defining a slot;

a telescoping riser removably receivable by a riser receiver of the lower frame comprising a lifting rod removably receivable within the slot;

the jack stand configured for removably capturing a jack mechanism between a support bracket and the lifting rod for lifting and lowering the telescoping riser under load;

a pair of telescoping legs, each telescoping leg configured for removable attachment to its respective adjustable leg brackets at a plurality of selectable pivotal positions for adjustable width support of the lower frame;

wherein lifting the telescoping riser under load causes lifting displacement of the telescoping riser with respect to the lower frame, the adjustable leg brackets, and the telescoping legs with the lifting rod traveling within the slot.

9. The adjustable tree jack of claim 8, wherein the jack mechanism is positioned for causing lifting displacement of the telescoping riser in a selected state of telescoping extension.

10. The adjustable tree jack of claim 8, wherein the telescoping riser further comprising a tree brace for interfacing with a fallen tree trunk lifted by the telescoping riser.

11. The jack stand of claim 8, further comprising a pair of feet, wherein each foot is configured for removable attachment to a respective telescoping leg.

12. The jack stand of claim 11, wherein each foot is configured for pivotal attachment to its respective telescoping leg.

13. The jack stand of claim 12, wherein the jack mechanism is capturable between the support bracket on the lower frame pivotally connected to the base and the lifting rod for adjustable tilt of the lower frame with respect to the base.

14. A jack stand for an adjustable tree jack for assembly and disassembly into smaller, hand-carried sub-assemblies for field portability, the jack stand configured for removably capturing a jack mechanism, comprising:

a base;

a lower frame defining a slot comprising a support bracket, and comprising a pair of adjustable leg brackets;

a pair of telescoping legs removably attached to respective adjustable leg brackets, each telescoping leg configured for pivotal attachment to its respective adjustable leg brackets at a plurality of selectable pivotal positions for adjustable width support of the lower frame;

a pair of feet removably attached to respective telescoping legs;

a telescoping riser removably receivable by a riser receiver of the lower frame comprising a lifting rod removably receivable within the slot, the telescoping riser further comprising a tree brace for interfacing with a fallen tree trunk lifted by the telescoping riser;

the jack stand configured for removably capturing the jack mechanism between the support bracket and the lifting rod for lifting and lowering the telescoping riser under load;

wherein lifting the telescoping riser under load causes lifting displacement of the telescoping riser with respect to the lower frame, the adjustable leg brackets, and the telescoping legs with the lifting rod traveling within the slot;

wherein the jack mechanism is configured for causing lifting displacement of the telescoping riser in a selected state of telescoping extension.

* * * * *